United States Patent
Urbank et al.

(10) Patent No.: US 6,800,022 B2
(45) Date of Patent: Oct. 5, 2004

(54) INLET AIR CONTROL METHOD FOR A VEHICLE HVAC SYSTEM HAVING AN AIR QUALITY SENSOR

(75) Inventors: Thomas Martin Urbank, Lockport, NY (US); Karma Vir Sangwan, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/369,249

(22) Filed: Feb. 19, 2003

(65) Prior Publication Data

US 2004/0162016 A1 Aug. 19, 2004

(51) Int. Cl.[7] .............................................. B60H 1/00
(52) U.S. Cl. ...................... 454/139; 454/143; 454/75
(58) Field of Search .................... 454/75, 139, 143, 454/146, 148

(56) References Cited

U.S. PATENT DOCUMENTS

| | | | |
|---|---|---|---|
| 5,259,813 A | * 11/1993 | Abthoff et al. ............. 454/75 |
| 5,725,425 A | 3/1998 | Rump et al. ................ 454/75 |
| 5,934,987 A | * 8/1999 | Baruschke et al. ........ 454/75 |
| 5,971,844 A | * 10/1999 | Samukawa et al. ....... 454/75 |
| 5,980,378 A | * 11/1999 | Wieszt ...................... 454/75 |
| 6,293,115 B1 | 9/2001 | Forrest et al. |
| 6,367,271 B2 | 4/2002 | Forrest et al. |
| 6,508,408 B2 | 1/2003 | Kelly et al. |

* cited by examiner

Primary Examiner—Derek S. Boles
(74) Attorney, Agent, or Firm—Patrick M. Griffin

(57) ABSTRACT

An improved HVAC control method immediately closes an air inlet valve to provide full cabin air recirculation when an outside air quality sensor detects polluted air, and thereafter progressively re-opens the air inlet valve at a determined rate when the air quality sensor detects unpolluted air. Preferably, the air quality sensor quantifies the pollution level of the outside air, and the opening rate of the air inlet valve is determined based on the detected pollution level. Following a high level of detected air pollution, the valve is re-opened at a relatively slow rate, and following a low level of detected air pollution, the valve is re-opened at a relatively fast rate.

11 Claims, 4 Drawing Sheets

INLET AIR CONTROL METHOD FOR A VEHICLE HVAC SYSTEM HAVING AN AIR QUALITY SENSOR

TECHNICAL FIELD

This invention relates to a vehicle heating, ventilation and air conditioning (HVAC) system having an air quality sensor and an inlet air control valve, and more particularly to an improved method of operating the inlet air control valve.

BACKGROUND OF THE INVENTION

Vehicle HVAC systems commonly include an inlet air controller such as a movable valve or shutter (referred to herein simply as an inlet air valve) that is positioned to control what proportion of the inlet air is drawn from inside and outside the vehicle cabin. In a typical application, a system controller positions the air inlet valve to optimize system efficiency and occupant comfort, and the occupant is permitted to override the normal control when full cabin air recirculation or full outside air is desired. For example, cabin air recirculation may be used to limit the intrusion of polluted air when driving in congested traffic, and full outside air may be used to purge the cabin of smoke or odors. However, the average driver frequently fails to manually position the inlet air valve as recommended, and sometimes polluted air has already entered the cabin by the time the driver switches to cabin air recirculation. For these reasons, the trend is to equip vehicle HVAC systems with a filtering system and one or more air quality sensors; the filtering system filters particulates and odors from the inlet air, and the inlet air valve is automatically positioned based on the air quality sensor to minimize the amount of polluted air entering the inlet air stream. See, for example, the U.S. Pat. No. 5,725,425 to Rump et al., issued on Mar. 10, 1998, and incorporated by reference herein.

A problem that occurs with automated positioning of the inlet air valve based on air quality sensing is that the HVAC system can be repeatedly cycled between the outside air and recirculation modes, particularly when the vehicle is operated in congested city traffic. Each opening and closing of the air inlet valve changes the HVAC noise level in the cabin, and the changing noise level can be annoying to the vehicle occupants. Accordingly, what is needed is an improved method of operating the air inlet valve in response to detected inlet air quality that provides the improved cabin air quality in a way that is less perceptible to the vehicle occupants.

SUMMARY OF THE INVENTION

The present invention is directed to an improved method for controlling an inlet air valve in a vehicle HVAC system including an air quality sensor in an outside air inlet passage, wherein the air inlet valve is immediately closed to provide cabin air recirculation when the sensor detects the presence of polluted air, and is thereafter re-opened at a determined rate when the outside air is no longer polluted. In a preferred embodiment, the air quality sensor output quantifies the pollution level of the inlet air, and the opening rate of the air inlet valve is determined based on the detected level. Following a high level of detected air pollution, the valve is re-opened at a relatively slow rate, and following a low level of detected air pollution, the valve is re-opened at a relatively fast rate.

DESCRIPTION OF THE PREFERRED EMBODIMENT

Figure 1:
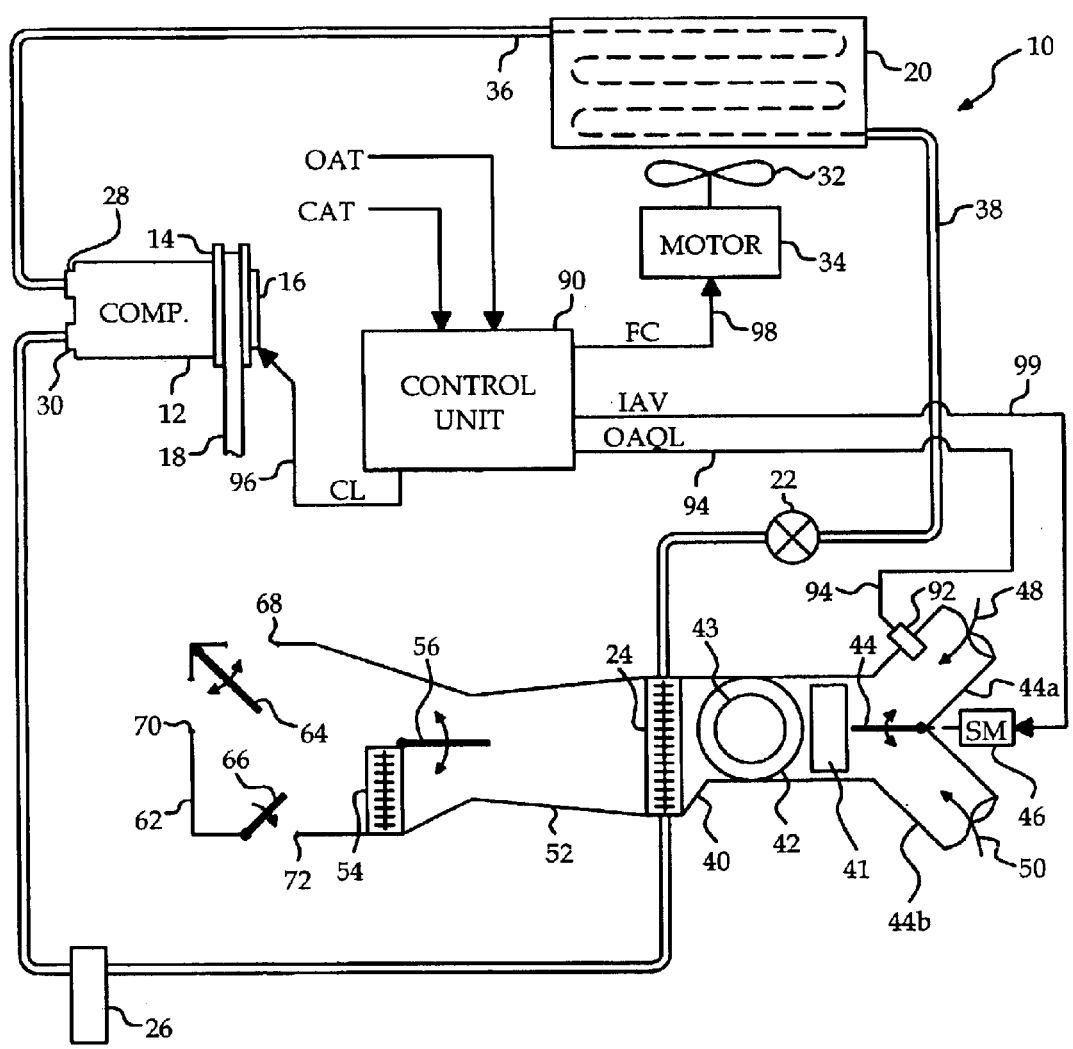
FIG. 1 is a block diagram of a vehicle HVAC system according to this invention, including an air inlet valve, an air quality sensor and a microprocessor-based control unit.

Referring to FIG. 1, the reference numeral 10 generally designates a vehicle HVAC system, including a refrigerant compressor 12 coupled to a drive pulley 14 via an electrically activated clutch 16. In the illustrated embodiment, the compressor 12 has a fixed stroke, and the cooling capacity is controlled by cycling the clutch 16. However, it should be understood that the compressor 12 may alternatively be a variable capacity compressor, in which case an electric or pneumatic stroke control valve is used to achieve capacity control. In any case, the drive pulley 14 is coupled to a rotary shaft of the vehicle engine (not shown) via drive belt 18.

The system 10 further includes a condenser 20, an orifice tube 22, an evaporator 24, and an accumulator/dehydrator 26 arranged in order between the compressor discharge port 28 and suction port 30. A cooling fan 32, operated by an electric drive motor 34, is controlled to provide supplemental air flow through the condenser 20 for removing heat from condenser 20. The orifice tube 22 allows the cooled high pressure refrigerant in line 38 to expand in an isenthalpic process before passing through the evaporator 24. The accumulator/dehydrator 26 separates low pressure gaseous and liquid refrigerant, directs a gaseous portion to the compressor suction port 30, and acts as a reservoir for the reserve refrigerant charge. In an alternative system configuration, the orifice tube 22 is replaced with a thermostatic expansion valve (TXV); in this case, the accumulator/dehydrator 26 is omitted, and a receiver/drier (R/D) is inserted in line 38 upstream of the TXV to ensure that sub-cooled liquid refrigerant is supplied to the inlet of the TXV.

The evaporator 24 is formed as an array of finned refrigerant conducting tubes, and an air intake duct 40 disposed on one side of evaporator 24 houses an air filter 41 and an inlet air blower 42 driven by an electric blower motor 43 to force the inlet air past the filter 41 and evaporator 24. The air intake duct 40 is bifurcated upstream of the filter 41 and blower 42, and an inlet air valve 44 is adjustable as shown by the servo motor (SM) 46 to control inlet air mixing. Depending on the position of inlet air valve 44, outside air may enter air intake duct 40 through duct leg 44a as indicated by arrow 48, and passenger compartment air may enter air intake duct 40 through duct leg 44b as indicated by arrow 50. For purposes of this disclosure, the air inlet valve 44 is considered to be closed when the leg 44a is fully restricted, and the inlet air consists essentially of cabin air from the leg 44b; conversely, the air inlet valve 44 is considered to be open when the leg 44b is fully restricted, and the inlet air consists essentially of outside air from the leg 44a.

An air outlet duct 52 disposed on the downstream side of blower 42 and evaporator 24 houses a heater core 54 formed as an array of finned tubes that conduct engine coolant. The heater core 54 effectively bifurcates the outlet duct 52, and a re-heat valve 56 is adjustable as shown to control how much of the air must pass through the heater core 54. The heated and un-heated air portions are mixed in a plenum portion 62 of outlet duct 52 downstream of re-heat valve 56, and a pair of mode control valves 64, 66 direct the mixed air through one or more outlets, including a defrost outlet 68, a panel outlet 70, and a heater outlet 72. The mode control valve 64 is adjustable as shown to switch the outlet air between the defrost and panel outlets 68, 70, and the mode control valve 66 is adjustable as shown to control airflow through the heater outlet 72.

The system 10 is controlled by the microprocessor-based control unit 90 based on various inputs. In the illustrated embodiment, such inputs include: cabin air temperature CAT, the outside air temperature OAT, outside air quality level OAQL, and the usual operator demand inputs, such as the desired temperature, and override controls for the inlet air valve 44. The CAT and OAT signals are obtained with conventional temperature sensors (not shown), and the OAQL signal is provided by the air quality sensor 92. The air quality sensor 92 is mounted on the outside air inlet leg 44a as indicated, and its OAQL output signal on line 94 provides an indication of the level of pollutants in the inlet leg 44a. In the illustrated embodiment, the sensor 92 may be a Paragon MK IV air quality sensor, available from Paragon AG, in which case the output OAQL assumes one of four possible voltage levels following an initial warm-up period: a first voltage level for clean (i.e., unpolluted) air, and second, third and fourth levels for increasingly polluted air. See, for example, the trace of Graph A, FIG. 2, which represents a typical OAQL signal vs. time during driving in congested traffic; in Graph A, the level C designates clean air, and the levels I, II and III designate increasingly polluted air.

In response to the above mentioned and other inputs, the control unit 90 develops output signals for controlling the compressor clutch 16, the cooling blower motor 34, the blower motor 43, and the air control valves 44, 56, 64 and 66. In FIG. 1, the output signal CL for the clutch 16 appears on line 96, and the output signal FC for the condenser fan control appears on line 98. The output signal IAV for positioning the inlet air valve 44 appears on line 99, and is applied as an input to the servo motor 46, which in turn, is mechanically coupled to inlet air valve 44 as mentioned above. For simplicity, output signals and actuators for the blower motor 43 and the air control valves 56, 64, 66 have been omitted in FIG. 1.

According to the present invention, the control unit 90 regulates the position of inlet air valve 44 in response to the outside air quality level signal OAQL so as to minimize the admission of polluted air into the inlet air stream. When the OAQL signal indicates the presence of polluted air in inlet leg 44a, the control unit 90 quickly closes the air inlet valve 46 to provide full cabin air recirculation. When the polluted air is no longer present, the control unit 90 re-opens the inlet air valve 46 at a determined rate. The re-opening rate is determined based on the indicated pollution level prior to the indication of clean air. The different rates for the air quality sensor 46 of the illustrated embodiment are graphically depicted in FIG. 3. Each of the Graphs A–C depict an inlet air valve control signal IAV developed by control unit 90 as a function of time. Graph A depicts a situation in which the OAQL signal indicates level I air pollution in the time interval t0–t1; Graph B depicts a situation in which the OAQL signal indicates level II air pollution in the interval t0–t1; and Graph C depicts a situation in which the OAQL signal indicates level III air pollution in the interval t0–t1. So long as the OAQL signal indicates the presence of polluted air, the inlet air valve 44 is maintained closed for full cabin air recirculation (RECIRC) as indicated. When the OAQL signal returns to C (clean air) at time t1, the inlet air valve 44 is re-opened (i.e., to full outside air OSA) at a determined rate. In the situation depicted by Graph A, the indicated pollution level was low (level I), and the control unit 90 re-opens the inlet air valve 44 at a relatively fast rate A that will fully open the valve 44 at time t2, which may be approximately 12 seconds after time t1. In the situation depicted by Graph B, the indicated pollution level was medium (level II), and the control unit 90 re-opens the inlet air valve 44 at a medium rate B that will fully open the valve 44 at time t3, which may be approximately 30 seconds after time t1. In the situation depicted by Graph C, the indicated pollution level was high (level III), and the control unit 90 re-opens the inlet air valve 44 at a relatively slow rate C that will fully open the valve 44 at time t4, which may be approximately 60 seconds after time t1. Alternatively, the rate of re-opening may be non-linear (exponential, for example) instead of linear, as designated by the broken traces A', B' and C' in Graphs A, B and C, respectively.

Figure 2:
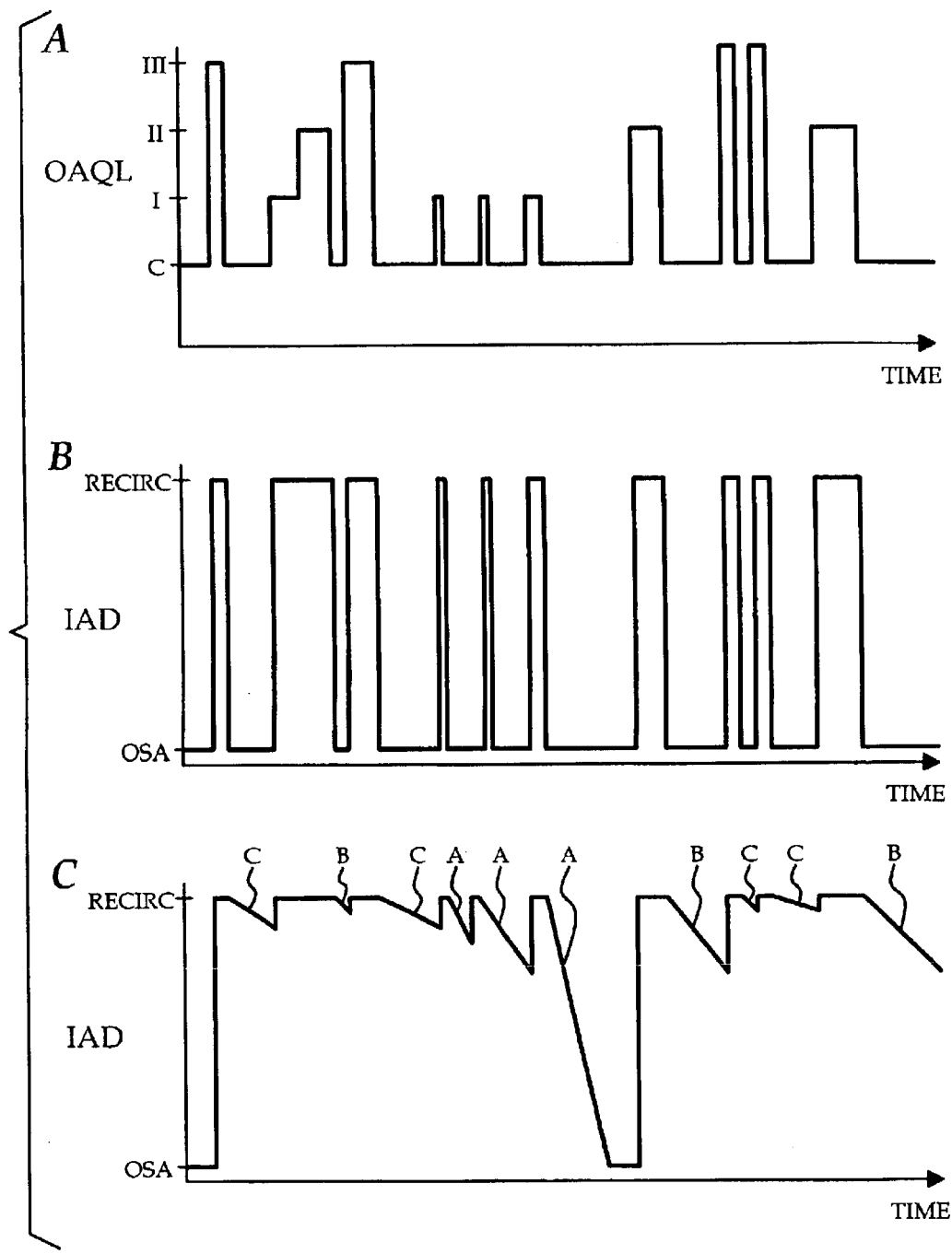
FIG. 2, Graphs A–C, depict the operation of the system of FIG. 1 in a period of driving in congested traffic. Graph A depicts the output of the air quality sensor, Graph B depicts a conventional control of the air inlet valve, and Graph C depicts a control of the air inlet valve according to this invention.

Graphs A and C of FIG. 2 illustrate the effect of the above-described control (with linear re-opening rates A, B and C) for a period of driving in stop-and-go city traffic. The inlet air valve 44 is re-opened at a rate (A, B or C) corresponding to the indicated pollution level (I, II or III) just prior to receipt of the clean air indication. In contrast, Graph B illustrates a conventional or known control in which the air inlet valve 44 is quickly re-opened each time the OAQL signal indicates the presence of clean air. Comparing Graphs B and C, it is easily seen that the control of the present invention results in significantly less movement of the inlet air valve 44, and testing has shown that the cabin noise level fluctuation under such driving conditions is significantly reduced.

Figure 4:
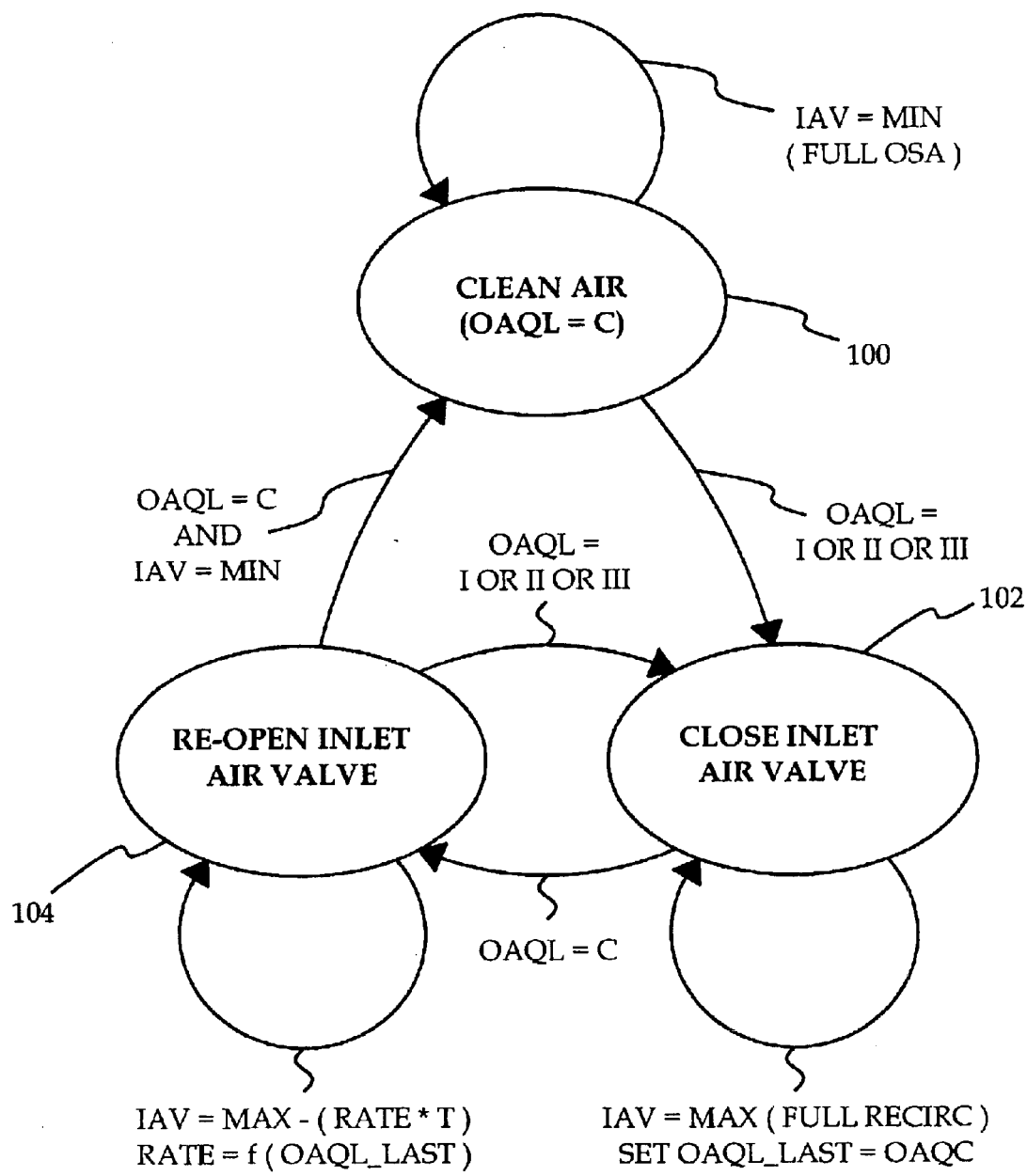
FIG. 4 is a state diagram depicting the functionality of a software routine executed by the microprocessor-based control unit of FIG. 1 in carrying out the control of this invention.

The state diagram of FIG. 4 represents the functionality of a software routine executed by the control unit 90 for carrying out the control of this invention. The diagram depicts three states or modes of operation: a Clean Air state 100 in which OAQL=C, a Close Inlet Air Valve state 102 that is entered whenever OAQL transitions from C to I, II or III, and a Re-Open Inlet Air Valve state 104 that is entered whenever OAQL transitions from levels I, II or III to C. In state 100, the control unit 90 sets the inlet air valve signal IAV at a minimum value MIN for full outside air (OSA). In state 102, the control unit 90 sets the inlet air valve signal IAV at a maximum value MAX for full cabin air recirculation (RECIRC), and updates a variable OAQL_LAST to store the most recent level of the air quality signal OAQL prior to a transition to the C level. In state 104, the control unit 90 sets the inlet air valve signal IAV according to:

IAV=MAX−(RATE*$T$)

where RATE is a rate determined as a function of OAQL_LAST, and T is the elapsed time in state 104. Thus, state 104 serves to re-open the inlet air valve 44 at a determined rate as described above in respect to FIGS. 2–3, and the control unit 90 transitions to the state 106 when IAV has been reduced to the minimum value MIN (for full OSA), provided that OAQL remains at level C. If OAQL transitions from level C to levels I, II or III while the state 104 is active, the control unit 90 will re-enter state 102 as indicated in FIG. 4.

Figure 3:
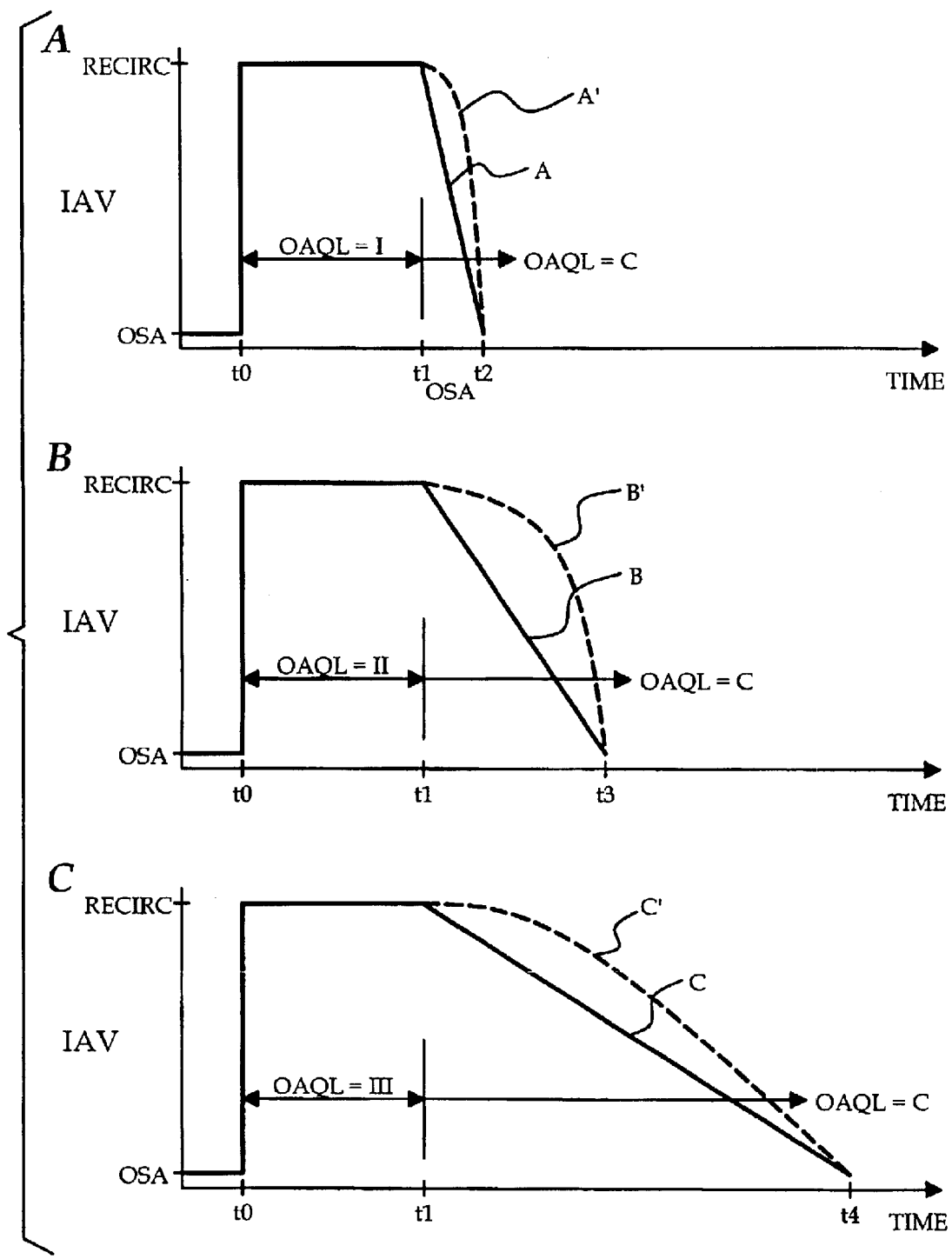
FIG. 3, Graphs A–C, depict the control of the air inlet valve according to this invention. Graphs A, B and C respectively depict re-opening of the inlet air valve following periods of high, medium and low air pollution levels.

In summary, the control of this invention provides a novel and advantageous way of operating an inlet air valve in response to sensed air quality that achieves the objective of minimizing intrusion of polluted air into the vehicle cabin while also minimizing the associated noise level in the cabin. Since the noise fluctuation introduced by the control is less perceptible to the occupants, the driver is less likely to override the control in a way that provides less effective filtering of the cabin air. While described in reference to the illustrated embodiment, it is expected that various modifications in addition to those mentioned above will occur to those skilled in the art. Thus, the control of this invention may be applied to air conditioning systems configured differently than shown in FIG. 1, or to air quality sensors that provide an output that is different than described herein. For instance, if the air quality sensor 46 is configured to provide an output that varies continuously (linear or non-linear) with the detected level of pollution, the reopening rate may be calibrated as a function of the sensor output level to achieve essentially the same operation as depicted in FIGS. 2–3. Accordingly, it will be understood that methods incorporating these and other modifications may fall within the scope of this invention, which is defined by the appended claims.

What is claimed is:

1. A method of positioning an inlet air valve of a vehicle HVAC system for controlling what proportion of inlet air is drawn from outside and inside a vehicle cabin, the system including an air quality sensor for detecting a pollution level of air outside the vehicle cabin, the method comprising the steps of:

when the air quality sensor detects a transition from unpolluted air to polluted air, immediately moving the inlet air valve to a recirculation position whereat the inlet air consists essentially of air from inside the vehicle cabin; and when the air quality sensor detects a transition from polluted air to unpolluted air, determining a desired rate of movement of said inlet air valve based on a detected pollution level prior to such transition, and progressively moving the inlet air valve at said desired rate from said recirculation position to an outside air position whereat the inlet air consists essentially of air from outside the vehicle cabin.

2. The method of claim 1, wherein:

said desired rate varies in inverse relation to said detected pollution level.

3. The method of claim 2, where said desired rate is a linear rate.

4. The method of claim 2, where said desired rate is an exponential rate.

5. A method of positioning an inlet air valve of a vehicle HVAC system for controlling what proportion of inlet air is drawn from outside and inside a vehicle cabin, the system including an air quality sensor for detecting a pollution level of air outside the vehicle cabin, the method comprising the steps of:

establishing a first mode of operation for positioning the inlet air valve to a first position that restricts the inlet air to essentially air from outside the vehicle cabin when the air quality sensor detects unpolluted outside air;

establishing a second mode of operation for positioning the inlet air valve to a second position that restricts the inlet air to essentially air from inside the vehicle cabin when the air quality sensor detects polluted outside air; and establishing a third mode of operation for moving the inlet air valve from the second position to the first position at a determined rate when the air quality sensor detects a transition from polluted air to unpolluted air, where the determined rate varies according to a pollution level detected during said second mode of operation.

6. The method of claim 5, including the step of:

transitioning from the third mode of operation to the first mode of operation when the air inlet valve reaches said first position and the air quality sensor continues to detect unpolluted air.

7. The method of claim 5, including the step of:

transitioning from the third mode of operation to the second mode of operation when the air quality sensor re-detects polluted air.

8. The method of claim 5, including the steps of:

storing the pollution level detected by the air quality sensor during said second mode of operation; and determining the rate of movement of the air inlet valve during the third mode of operation based on the stored pollution level.

9. The method of claim 8, including the step of:

updating said stored pollution level during said second mode of operation so that the rate of movement of the air inlet valve during the third mode of operation is determined based on the detected pollution level just prior to said transition from polluted air to unpolluted air.

10. The method of claim 5, where the determined rate is a linear rate.

11. The method of claim 5, where the determined rate is an exponential rate.

* * * * *